United States Patent [19]
Larson

[11] Patent Number: 5,219,533
[45] Date of Patent: Jun. 15, 1993

[54] APPARATUS FOR SOLVENT EXTRACTION PROCESS

[75] Inventor: Richard I. Larson, Wilmington, N.C.

[73] Assignee: General Electric Company, San Jose, Calif.

[21] Appl. No.: 793,926

[22] Filed: Nov. 18, 1991

[51] Int. Cl.⁵ .............................................. B01D 11/04
[52] U.S. Cl. .................................. 422/159; 422/256; 422/257; 261/113; 210/521
[58] Field of Search ...................... 422/256, 257, 159; 261/113; 210/521

[56] References Cited

U.S. PATENT DOCUMENTS

| | | | |
|---|---|---|---|
| 3,632,315 | 1/1972 | Uitti et al. | 422/256 |
| 3,854,176 | 12/1974 | Kendall et al. | 422/257 X |
| 4,429,049 | 1/1984 | Rogers et al. | 422/257 X |
| 4,615,834 | 10/1986 | Yamagishi et al. | 422/159 X |
| 4,732,685 | 3/1988 | Brandt et al. | 210/785 X |
| 4,832,923 | 5/1989 | Lonie | 422/257 X |

Primary Examiner—Robert J. Warden
Assistant Examiner—Stephanie Blythe
Attorney, Agent, or Firm—Robert R. Schroeder

[57] ABSTRACT

An apparatus for solvent extraction processes utilizing countercurrent flow of streams of an aqueous phase and an organic phase, such as the Purex process for uranium recovery. The invention comprises contouring the fluid passing orifices in the column phase dispersing perforated plates to impede droplet coalescence of the dispersed phase.

7 Claims, 3 Drawing Sheets

APPARATUS FOR SOLVENT EXTRACTION PROCESS

FIELD OF THE INVENTION

This invention relates to means for carrying out solvent extraction procedures employing countercurrent flow of streams of an aqueous phase and an organic phase while passing through a fluid contacting extraction column followed by a stripping column. The invention particularly relates to the so-called "Purex Process" for recovering uranium from waste or spent material containing unwanted contaminants, such as scrap from fissionable nuclear fuel manufacturing or processing, and spent fissionable nuclear fuel from use in a nuclear reactor. Although this invention is particularly applicable to Purex type extraction procedures, its use is not limited to such processes, and it is applicable to any countercurrent liquid solvent extraction measure employing typical extraction columns.

BACKGROUND OF THE INVENTION

This so-called "Purex Process" of solvent extraction for uranium is well known in the nuclear fuel art and industry. For example, the process is described in the U.S. Pat. No. 3,357,802, issued Dec. 12, 1967, U.S. Pat. No. 4,595,529, issued Jun. 17, 1986, U.S. Pat. No. 4,758,313, issued Jul. 19, 1988, and discussed in extensive detail in Chapter 10, entitled "Fuel Processing," namely pages 457 to 514, of *Nuclear Chemical Engineering*, by Benedict et al, McGraw-Hill Book Company, 1981. The disclosed contents of the fore going cited patents and section of the text are accordingly incorporated herein by reference.

Briefly, the Purex Process consists of a sequence of chemical steps or operations comprising initially treating the waste of scrap material or spent fuel containing uranium compounds with an aqueous solution of nitric acid ($HNO_3$), and thereby dissolving the uranium to produce uranyl nitrate ($UO_2(NO_3)_2$) and other acid soluble components within an aqueous phase. This aqueous phase containing the acid dissolved components including uranyl nitrate, and any acid insoluble components of the waste is passed down through an extraction column while an organic phase of tri-butyl phosphate in an organic diluent of a paraffinic mixture such as kerosene is passed up through the extraction column in counter-current flow with the aqueous phase. The soluble uranium compounds comprising uranyl nitrate of the aqueous phase are extracted therefrom by the organic phase and combined with the tri-butyl phosphate. This separates the uranium and carries it within the organic phase from the extraction column. The aqueous phase, and the organic phase each exit from the extraction column at opposite ends from each other and from their respective entries, the aqueous phase with the acid soluble raffinate contaminants and the organic phase with the separated uranium.

The organic phase effluent from the extraction column carrying the separated uranium compounds is then passed up through a stripping column while water is passed down through the stripping column in countercurrent flow with the organic phase. The water releases the uranium from the tri-butyl phosphate of the organic phase whereby it is transferred to and carried within the aqueous phase. The aqueous phase, and the organic phase each exit from the stripping column at opposite ends from each other and from their respective entries, the aqueous phase containing the uranium compounds for recovery separated from contaminants. The organic phase is then recycled back through the extraction column. Typically, the procedure is carried out with a continuous flow of all components through the system comprising the extraction column and stripping column.

The columns are typically agitated by either pulse pumps or reciprocating plates to permit optimal droplet formation and coalescence on each plate. The agitation is most commonly referred to as mixing energy. Excessive mixing energy or flow rates can cause flooding, a condition which precludes flow of one or both liquid operating mode phases in the column due mainly to coalescence of small droplets into larger droplets. Mixing energy is critical to efficiency of the extraction column and helps establish a characteristic uranium profile.

SUMMARY OF THE INVENTION

This invention comprises an apparatus providing improved total production throughput of the two liquid phases and their separating effectiveness in pulsed solvent extraction processes employing countercurrent flow of streams of an aqueous phase and an organic phase. The apparatus responsible for such improved functioning comprises a contouring of fluid passing orifices in the phase dispensing perforated plates utilized in conventional extraction columns.

DETAILED DESCRIPTION OF THE INVENTION

Figure 1:
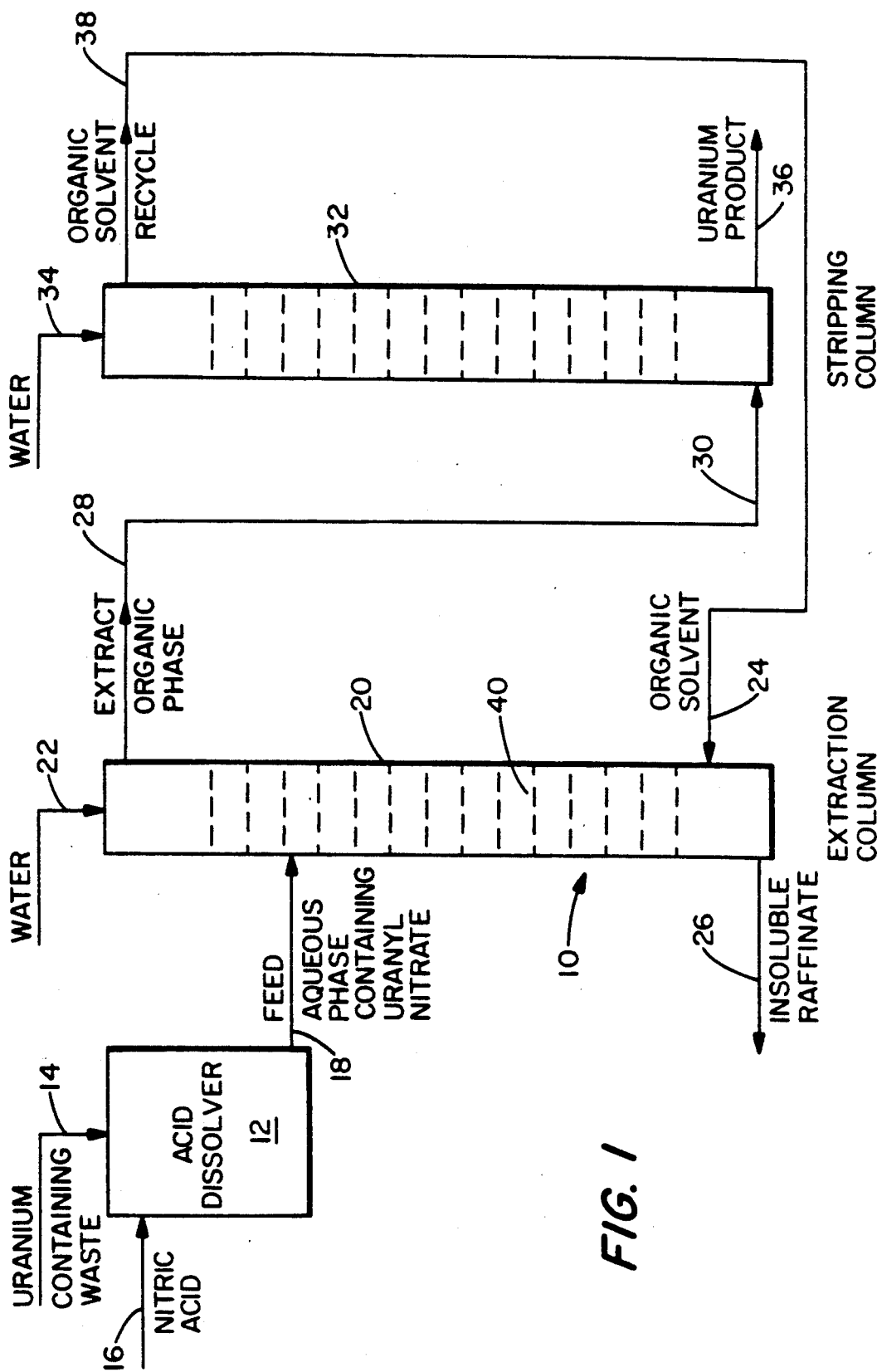
FIG. 1 of the drawings comprises a simplified flow diagram of an apparatus for a countercurrent flow solvent extraction process.

Referring to the drawings, in particular FIG. 1, a typical solvent extraction and purification system 10, such as the Purex process for the recovery of uranium, for example, comprises an acid dissolving vessel 12 provided with a source of waste material 14 containing uranium compounds and a supply of nitric acid ($HNO_3$) 16 in an aqueous medium. Uranium contents of the waste material, along with any other nitric acid soluble components, are dissolved with the nitric acid in vessel 12, converting the uranium compounds into water soluble uranyl nitrate. This aqueous phase of weak acid containing any nitric acid soluble components of the waste and the soluble components including the uranyl nitrate are fed through a feed inlet 18 into the upper portion of an extraction column 20. Preferable this aqueous phase from vessel 12 is filtered before feeding into extraction column 20.

The aqueous phase, containing any nitric acid soluble components including uranyl nitrate and soluble components, fed into the extraction column 20 flows downward within the column while an organic phase is fed through a feed inlet 24 into the lower portion of the extraction column 20 and flows upward within the column counter-current to the down flowing aqueous phase. The organic solvent phase, containing tri-butyl phosphate and an organic diluent, upon making counter-flowing contact with the extraction column with the aqueous phase, separates the uranium by means of the tri-butyl phosphate chemically combining with the uranium oxide ++ ions dissolved in the aqueous phase while excluding soluble impurities. The insoluble impurities are carried downward in the aqueous phase to an outlet 26 in the lower portion of the extraction column 20 for soluble raffinate.

The organic phase of tri-butyl phosphate combined with uranium and the organic diluent flows upward to an extract outlet 28 in the upper portion of the extraction column 20.

From extractor column outlet 28, the organic phase containing the uranium combined with the tri-butyl phosphate and organic diluent is conveyed through a duct to an inlet 30 in the lower portion of a stripping column 32. Water is fed into the upper portion of the stripper column 32 through inlet 34 for flow downward through the column countercurrent to the upward flow of the organic phase entering in a lower portion. The water contacting the organic phase in counter flow within the stripping column 32 releases the water soluble uranium compounds from the tri-butyl phosphate and organic phase, and the water containing the separated uranyl nitrate product is discharged from the column through an outlet 36 in its lower portion. An organic phase outlet 38 for the organic solvent in the upper portion of stripping column 32 discharges the organic solvent into a duct which is in fluid communication with the organic phase inlet 24 for recycling the organic solvent comprising the tri-butyl phosphate and organic diluent for reuse.

The countercurrent flow solvent extraction systems utilize columns provided with a multiplicity of phase dispensing perforated plates 40 traversing the column intermediate the upper area and lower area fluid connections for the entry or discharge of the counter-current flowing liquids. Phase dispensing plates 40 are provided with a plurality of fluid passing orifices 42, or nozzles passing therethrough as shown enlarged in FIG. 2. Plates 40 typically are of a thickness in the range of about 0.020 up to about 0.25 inch, and orifices 42 typically are of a diameter in the range of about 0.125 to about 0.25 inch. For example, approximately 0.022 inch for stainless steel plates and approximately 0.25 inch for teflon plates.

The function of a pulsed, solvent extraction column in countercurrent flow aqueous/organic phase solvent extraction processes is to disperse either the aqueous or the organic phase into small droplet sizes in the other phase as the continuous medium. Small droplet size of a phase increases the surface area per unit volume of the dispersed phase whereby the rate of mass transfer of the desired component for extraction from one of the phases to the other is in turn increased. However, the phenomenon of droplet coalescence within solvent extraction columns limits the overall mass transfer rate whereupon the separation efficiency along with the total throughput rate of the countercurrent aqueous and solvent flow streams is retarded. Moreover, as droplet diameters increase, the holdup of the dispersed phase or fractional volume of the dispersed phase increases. Large droplet diameters and increased holdup lead to flooding, the effect of the aqueous and organic solvent phases leaving the extraction column together through the organic solvent phase outlet.

Droplets of the dispersed phase form in the extraction column as the dispersed liquid exits from the fluid passing orifices in the phase dispersing perforated plates. Without pulsation the continuous laminar flow through the orifices produces droplet sizes equal to or great than the diameter of the orifice or nozzle throat. In a pulsed column the dynamic forces due to turbulent eddies formed at the exit of the orifice or nozzle break up the drops in opposition to interfacial forces.

In a pulsed column, the mechanical action of the pulsating flow produces turbulent eddies that reduce the diameter of the droplets formed at the exit of the fluid passing orifices, or nozzles in the phase dispersing plates. In an efficient operating extraction column, the dispersed droplets are a factor of 3 to 5 smaller than the orifice or nozzle diameter. On the other hand without the pulsating action, the droplet diameter is equal to or greater than the orifice or nozzle diameter. Accordingly, the improved mass transfer rates an total throughput attained with the small droplet size have lead to the use of pulsed columns, where significant component separation is required.

As the two phase flow from the pulsating action enters the fluid passing orifice or nozzle of the phase dispersing plates, the droplets tend to coalesce within the continuous phase in the region where the streamlines converge or diverge from the solid boundary forming larger droplets, thereby limiting the total throughput and separating efficiency.

Figure 2:
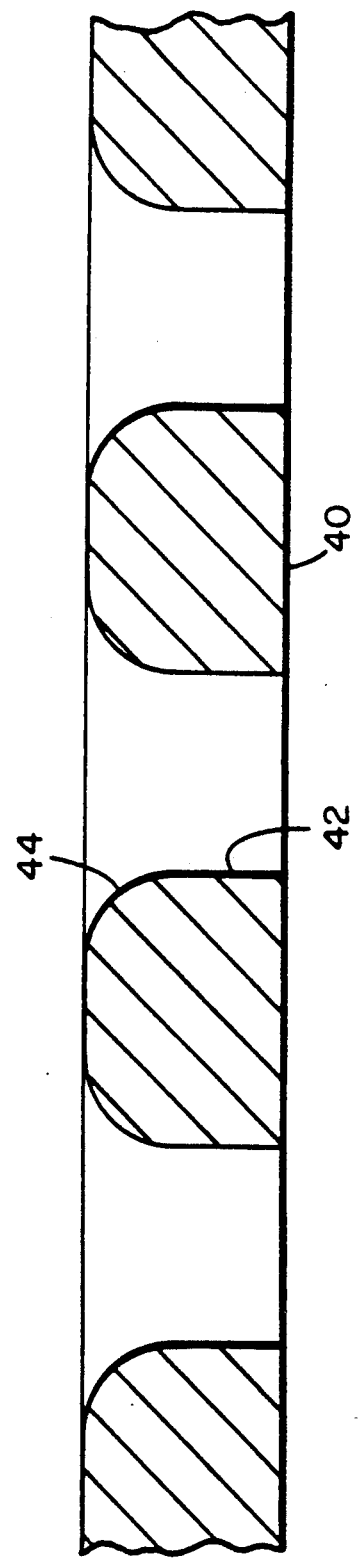
FIG. 2 of the drawings comprises a partial enlarged cross-sectional view of the phase dispersing perforated plates shown in FIG. 1.
Figure 3:
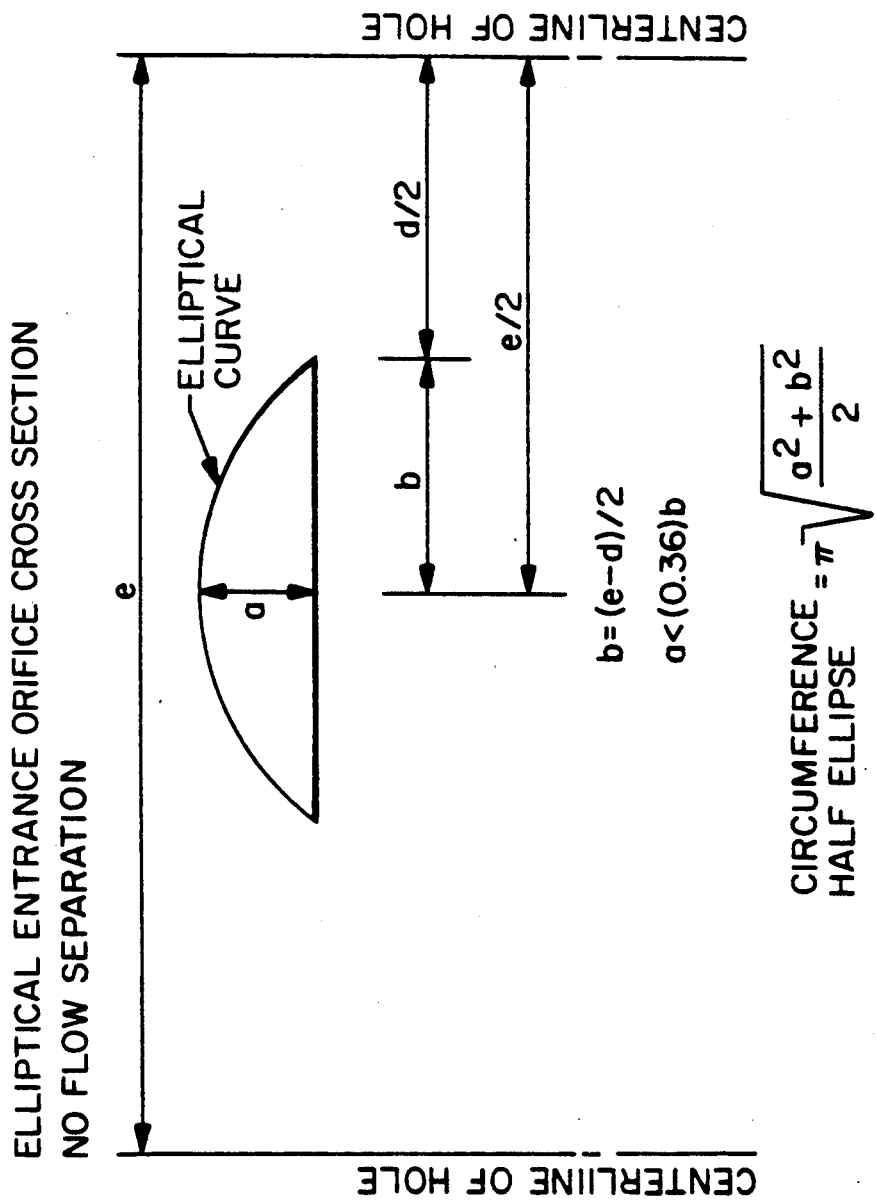
FIG. 3 of the drawings comprises a formula for defining the invention as to the optimum configuration.

In accordance with this invention, the fluid passing orifices 42, or nozzles in the phase dispersing perforated plates 40, are provided with their upper peripheral edge 44 rounded in an elliptical contour 46 as shown in FIG. 2 of the drawing. The contour of the elliptical curve for the upper peripheral edge 44 is defined approximately by the formula:

$$c = \pi \sqrt{\frac{a^2 + b^2}{2}}$$

where:
 c = circumference
 a and b = eliptical axis

With the elliptical curve contour 46 given in the formula for the upper peripheral edge 44 of fluid passing orifices 42, small droplets produced by pulsating action follow the stream line flow without coalescence accelerating through the orifice 42 throat, or the regions of smaller area. Thus the elliptical configuration of the orifices' 42 upper peripheral edge 44 minimizes droplet coalescence by maximizing the distance between drops of the dispersed phase and their distance from the solid boundary of the orifices.

Phase dispersing plates 40 as employed in this invention should be constructed of material depending upon whether or not the organic or aqueous phase is dispersed within the other. This is, when the aqueous phase is dispersed and this organic phase is continuous, the plates 40 and the column should be constructed from non-wetting materials or plastics such as TEFLON, a polytetrafluroethylene resin. This prevents the droplets of the aqueous phase from wetting the plates 40 or column surface on contact.

If the organic phase is dispersed in a continuous aqueous phase, the plates 40 and column materials can be either metal such as stainless steel or glass. Then the organic droplets will not wet the plates 40 or column surfaces.

What is claimed is:

1. An apparatus providing improved total productive throughout and separating effectiveness in pulsed solvent extraction processes with countercurrent flow of streams of an aqueous phase and an organic phase, consisting essentially of the combination of:
   a vertical extraction column with an aqueous phase inlet and an organic phase extract outlet located in an upper area of the column, and an insoluble raffinate outlet and an organic phase inlet located in a lower area thereof, and
   phase dispersing perforated plates transversing the column intermediate the upper area aqueous phase inlet and the lower area organic phase inlet and intervening into a flow therebetween, said perforated plates having a multiplicity of fluid passing orifices passing therethrough with their upper peripheral edge being rounded in an elliptical contour for reducing coalescing of phase droplets passing therethrough.

2. The apparatus providing improved total productive throughput and separating effectiveness in pulsed solvent extraction processes with countercurrent flow of streams with an aqueous phase and an organic phase of claim 1, wherein the multiplicity of fluid passing orifices in the phase dispersing plates are of a diameter within a range of about 0.125 to about 0.25 inch.

3. The apparatus providing improved total productive throughput and separating effectiveness in pulsed solvent extraction processes with countercurrent flow of streams of an aqueous phase and an organic phase of claim 1, wherein the phase dispersing plates are of a thickness within a range of about 0.020 to about 0.25 inch.

4. The apparatus providing improved total productive throughput and separating effectiveness in pulsed solvent extraction processes with countercurrent flow of streams of an aqueous phase and an organic phase of claim 1, wherein the phase dispersing plates are composed of a non-wetting plastic material.

5. The apparatus providing improved total productive throughput and separating effectiveness in pulsed solvent extraction processes with countercurrent flow of streams of an aqueous phase and an organic phase of claim 1, wherein the phase dispersing plates are composed of non-wetting TEFLON polytetrafluoroethylene resin.

6. The apparatus providing improved total productive throughput and separating effectiveness in pulsed solvent extraction processes with countercurrent flow of streams of an aqueous phase and an organic phase of claim 1, wherein the phase dispersing plates are composed of stainless steel.

7. An apparatus providing improved total productive throughput and separating effectiveness in pulsed solvent extraction processes with countercurrent flow of streams of an aqueous phase and an organic phase, consisting essentially of the combination of:
   a vertical extraction column with an aqueous phase inlet and an organic phase extract outlet located in an upper area of the column, and an insoluble raffinate outlet and an organic phase inlet located in a lowered area thereof, and
   a multiplicity of phase dispensing perforated plates of a thickness within the range of about 0.020 to about 0.25 inch transversing the vertical column intermediate the upper area aqueous phase inlet and the lower area organic phase inlet and intervening into a flow therebetween, said perforated plates having a multiplicity of fluid passing orifices passing therethrough of a diameter within the range of about 0.125 to about 0.25 inch with their upper peripheral edge being rounded in an elliptical contour defined by the formula $$c = \pi \sqrt{\frac{a^2 + b^2}{2}}$$

for reducing coalescing of phase droplets passing therethrough.

* * * * *